US012812592B2

(12) United States Patent
Silverman et al.

(10) Patent No.: US 12,812,592 B2
(45) Date of Patent: Nov. 24, 2026

(54) TRANSMISSION (Tx) POWER VARIATION MITIGATION FOR RECEIVED STRENGTH OF SIGNAL INDICATOR (RSSI) BASED LOCATION DETERMINATION

(71) Applicant: Cisco Technology, Inc., San Jose, CA (US)

(72) Inventors: Matthew Aaron Silverman, Shaker Heights, OH (US); Brian D. Hart, Sunnyvale, CA (US); Jonathan Matthew Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 18/300,696

(22) Filed: Apr. 14, 2023

(65) Prior Publication Data

US 2024/0349234 A1 Oct. 17, 2024

(51) Int. Cl.

*H04W 64/00* (2009.01)
*G01S 11/06* (2006.01)
*H04B 17/318* (2015.01)
*H04W 84/12* (2009.01)

(52) U.S. Cl.

CPC ........... *H04W 64/003* (2013.01); *G01S 11/06* (2013.01); *H04B 17/318* (2015.01); *H04W 84/12* (2013.01)

(58) Field of Classification Search

CPC ... H04W 64/003; H04W 84/12; H04B 17/318
See application file for complete search history.

(56) References Cited

U.S. PATENT DOCUMENTS

| | | | |
|---|---|---|---|
| 2006/0172711 A1 | 8/2006 | King et al. | |
| 2008/0130604 A1 | 6/2008 | Boyd | |
| 2017/0196010 A1 | 7/2017 | Matsuo et al. | |
| 2020/0374810 A1 | 11/2020 | Hart et al. | |
| 2022/0329393 A1 | 10/2022 | Ahn et al. | |
| 2024/0179663 A1 * | 5/2024 | Zorgui | H04W 64/00 |

* cited by examiner

*Primary Examiner* — Kathy W Wang-Hurst
(74) *Attorney, Agent, or Firm* — Merchant & Gould P.C.

(57) ABSTRACT

Transmission (Tx) power variation mitigation for Received Strength of Signal Indicator (RSSI) location may be provided. RSSI data for a station may be received from a plurality of Access Points (APs). The RSSI data may include a RSSI value determined from a Block Acknowledgement (BA) packet and a Starting Sequence Number (SSN) and a bitmap of the BA packet. The plurality of APs may be clustered into one or more clusters based on a combination of the SSN and the bitmap. One or more APs having a same combination of the SSN and the bitmap are clustered into one cluster. A probable location of the station may be determined in each of the one or more clusters based on RSSI values received from the one or more APs of each of the one or more clusters. A final location of the station may be determined based on merging probable locations from the one or more clusters.

17 Claims, 3 Drawing Sheets

TRANSMISSION (Tx) POWER VARIATION MITIGATION FOR RECEIVED STRENGTH OF SIGNAL INDICATOR (RSSI) BASED LOCATION DETERMINATION

TECHNICAL FIELD

The present disclosure relates Transmission (Tx) power variation mitigation for Received Strength of Signal Indicator (RSSI) based location determination.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
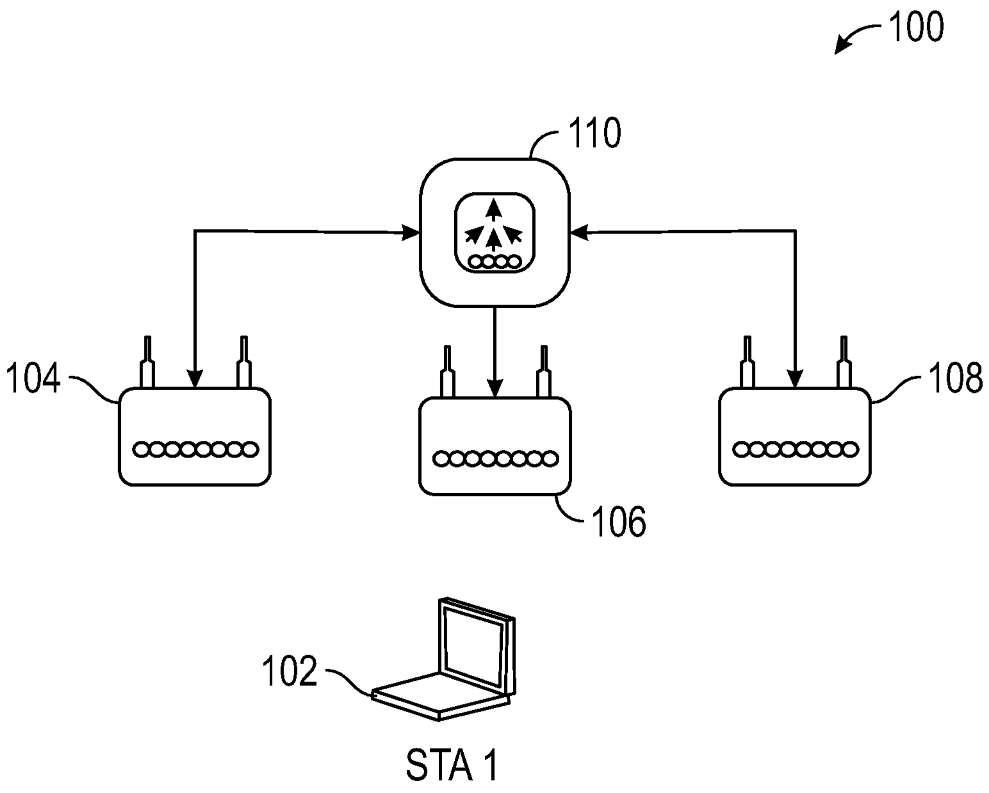
FIG. 1 is a block diagram of an operating environment.

Transmission (Tx) power variation mitigation for Received Strength of Signal Indicator (RSSI) location may be provided. RSSI data for a station may be received from a plurality of Access Points (APs). The RSSI data may include a RSSI value determined from a Block Acknowledgement (BA) packet and a Starting Sequence Number (SSN) and a bitmap of the BA packet. The plurality of APs may be clustered into one or more clusters based on a combination of the SSN and the bitmap. One or more APs having a same combination of the SSN and the bitmap are clustered into one cluster. A probable location of the station may be determined in each of the one or more clusters based on RSSI values received from the one or more APs of each of the one or more clusters. A final location of the station may be determined based on merging probable locations from the one or more clusters.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Network elements, in a Wireless Local Area Network (WLAN), often may need to know a location of a device communicating with the network. To determine the location of a device, a network element may send a request to the device and then may receive an acknowledgement in response. The network element then may determine characteristics of the signal containing the acknowledgement. For example, the network element may determine the Received Strength of Signal Indicator (RSSI). Other network elements may also determine the RSSI for the same device. Then, a set of network elements may triangulate the position of the device based on the received RSSI measurements.

The aforementioned method of determining a location of a device may assume a Transmission (Tx) power of the device. However, such assumption in the Tx power may lead to inaccurate location determination. The device, for example, may be in a power save mode and may have a different Tx power than assumed Tx power. For The Tx power, for example, may vary by 10s of decibels (dBs) when the device may be going in and out of power save mode. This variation may lead to a location error. The disclosure may provide processes for Tx power variation mitigation for RSSI based location determination.

FIG. 1 shows an operating environment 100 consistent with embodiments of the disclosure for Tx power variation mitigation for RSSI based location determination. As shown in FIG. 1, operating environment 100 may comprise a station 102, first Access Point (AP) 104, a second AP 106, a third AP 108, and a controller 110. Each first AP 104, second AP 106, and third AP 108 may be compatible with specification standards such as, but not limited to, the Institute of Electrical and Electronics Engineers (IEEE) 802.11 specification standard for example. First AP 104, second AP 106, and third AP 108 may communicate with each other to conduct operations in concert.

Controller 110 may Wireless Local Area Network (LAN) Controller (WLC). Controller 110 may provision and control operating environment 100. Controller 110 may be implemented by a Digital Network Architecture Center (DNAC) controller (i.e., a Software-Defined Network (SDN) controller). First AP 104, second AP 106, third AP 108, and controller 110 may provide a Wireless Local Area Network (WLAN). Through this WLAN, station 102 may be provided with access to a wireless network that may be operated by an institution or an enterprise. Access to the WLAN may provide station 102 with access to the Internet or other cloud-based networking environments.

Station 102 may be a user device and may comprise, but is not limited to, an AR/VR device, an AP, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

The elements of operating environment 100 (e.g., station 102, first AP 104, second AP 106, third AP 108, and controller 110) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of an operating environment may be practiced in a computing device 300.

Figure 2:
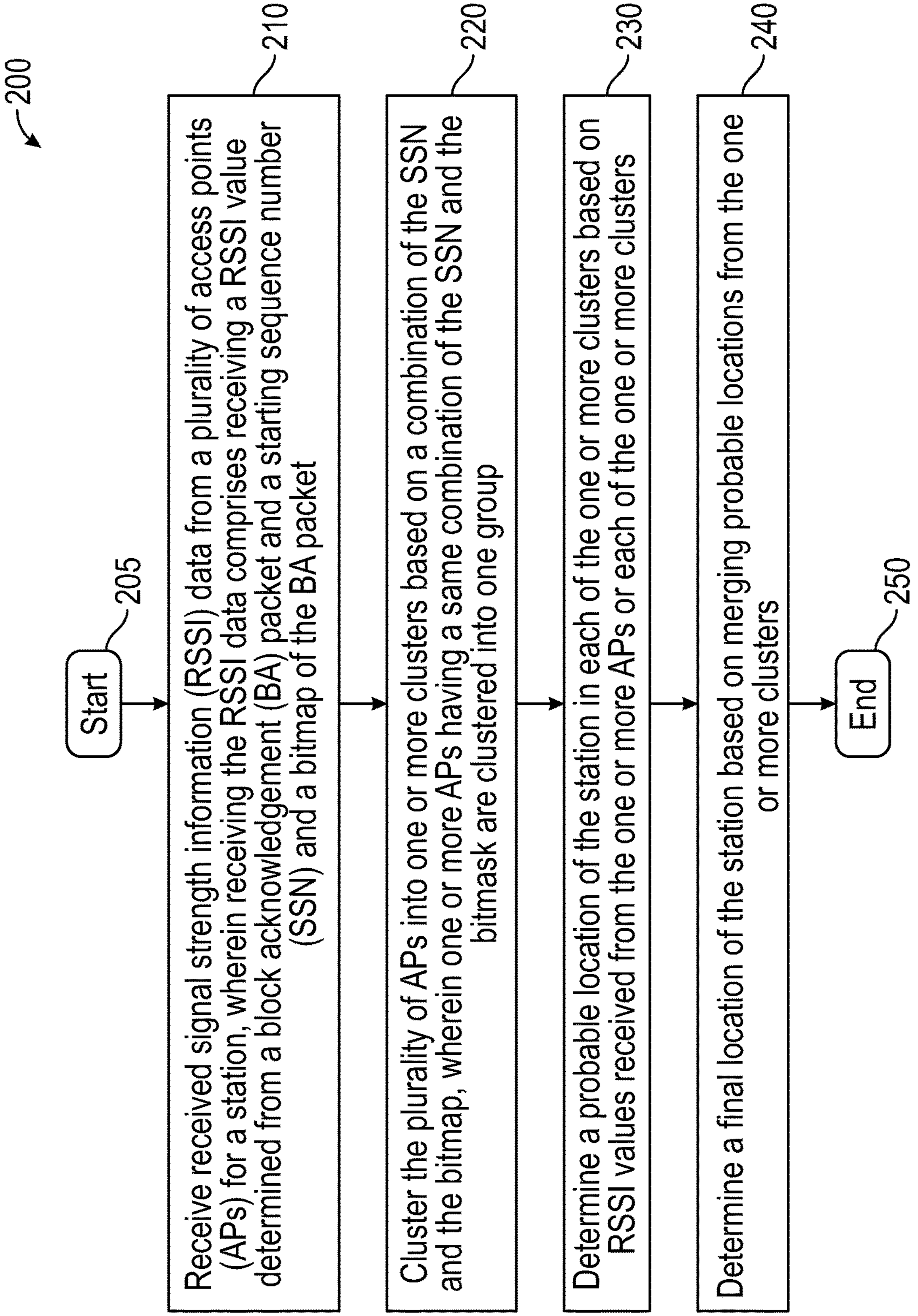
FIG. 2 is a flow chart of a method for Transmission (Tx) power variation mitigation for Received Strength of Signal Indicator (RSSI) based location determination.

FIG. 2 is a flow chart setting forth the general stages involved in a method 200 consistent with an embodiment of the disclosure for Tx power variation mitigation for RSSI based location determination. Method 200 may be performed by first AP 104, second AP 106, third AP 108, controller 110, or a location server associated with controller 110. Ways to implement the stages of method 200 may be described in greater detail below.

Method 200 may begin at starting block 205 and proceed to stage 210 where controller 110 may receive RSSI data from a plurality of APs for station 102. The RSSI data may comprise a RSSI value determined from a Block Acknowledgement (BA) packet and a Starting Sequence Number (SSN) and a bitmap of the BA packet. The RSSI data may further include an identifier (e.g., a Media Access Control (MAC) address) of station 102.

The plurality of APs may send a Block Acknowledgement Request (BAR) to station 102. The plurality of APs then may listen for BA packets from station 102. Different APs may scan to a channel at a same time and observe this exchange. Based on the observation, the plurality of APs may collect and report the RSSI data for station 102 to controller 110.

Each of the plurality of APs may include with a prioritized packet list. The prioritized packet list may comprise a listing of a plurality of BA packets to be observed for location determination and a priority level for each of the plurality of BA packets. Each of the plurality of BA packets may be identified through unique combination of a SSN and a bitmap. For example, a priority one BA packet may be identified through a SSN stating with bit 0 and a bitmap value of 32. Similarly, a priority two BA packet may be identified through a SSN stating with bit 0 and a bitmap value of 48, and so on. The SSN/Bitmap combination for each priority level may be predefined by an administrator and provided to the plurality of APs, for example, by controller 110.

When an AP (e.g., first AP 104) observes a first BA packet from station 102, it may determine if a SSN/Bitmap combination associated with the first BA packet is listed in the prioritized packet list. If it is, then first AP 104 may determine the priority level for the first BA packet and may determine RSSI data from the first BA packet. First AP 104 may keep or store the RSSI data to report to controller 110.

First AP 104 may replace the stored RSSI data with RSSI data of a higher priority level BA packet. For example, when first AP 104 observes a second BA packet, it may determine the priority level for the second BA packet. It the priority level for the second BA packet is higher than the priority level of the first BA packet, first AP 104 may replace the stored RSSI data with the RSSI data derived from the second BA packet. This way first AP 104 or each of the plurality of APs may always report the RSSI data of the highest priority level BA packet observed at that AP. All APs may not observe the highest priority level BA packet, and therefore, may report RSSI data corresponding to different priority levels Once controller 110 receives the RSSI data from the plurality of APs for station 102 in stage 210, method 200 may continue to stage 220 where controller 110 may cluster the plurality of APs into one or more clusters based on the SSN and the bitmap combination. One or more APs having a same combination of the SSN and the bitmap are clustered into one cluster. For example, one or more APs reporting the RSSI data from a BA packet having a priority level one may be clustered into one cluster. Similarly, one or more APs reporting the RSSI data from a BA packet having a priority level two may be clustered into another cluster, and so on.

After controller 110 clusters the plurality of APs into one or more clusters at stage 220, method 200 may proceed to stage 230 where controller 110 may determine a probable location of station 102 in each of the one or more clusters based on RSSI values received from the one or more APs of each of the one or more clusters. Controller 110 may determine the probable location of station 102 using a differential RSSI solution. In the differential RSSI solution, controller 110 may use relative RSSI values between the one or more APs of a cluster instead of using a nominal RSSI value. Use of the relative RSSI values may remove or mitigate the Tx power of station 102 from the location determination as the relative RSSI values are from a same BA packet.

Once controller 110 determines the probable location of station 102 in each of the one or more clusters in stage 230, method 200 may proceed to stage 240 where controller 110 may determine a final location of station 102 based on merging probable locations from the one or more clusters. Merging may include averaging the probable locations determined by the one or more clusters. Merging may also include weighted averaging the probable locations determined by the one or more clusters, the weight the probable location for each of the one or more clusters being determined based on a number of one or more APs in each of the one or more clusters. Merging may further include using a Machine Learning (ML) regression to determine the final location from the probable locations. After controller 110 determines the final location of station 102 in stage 240, method 200 may then end at stage 250.

Figure 3:
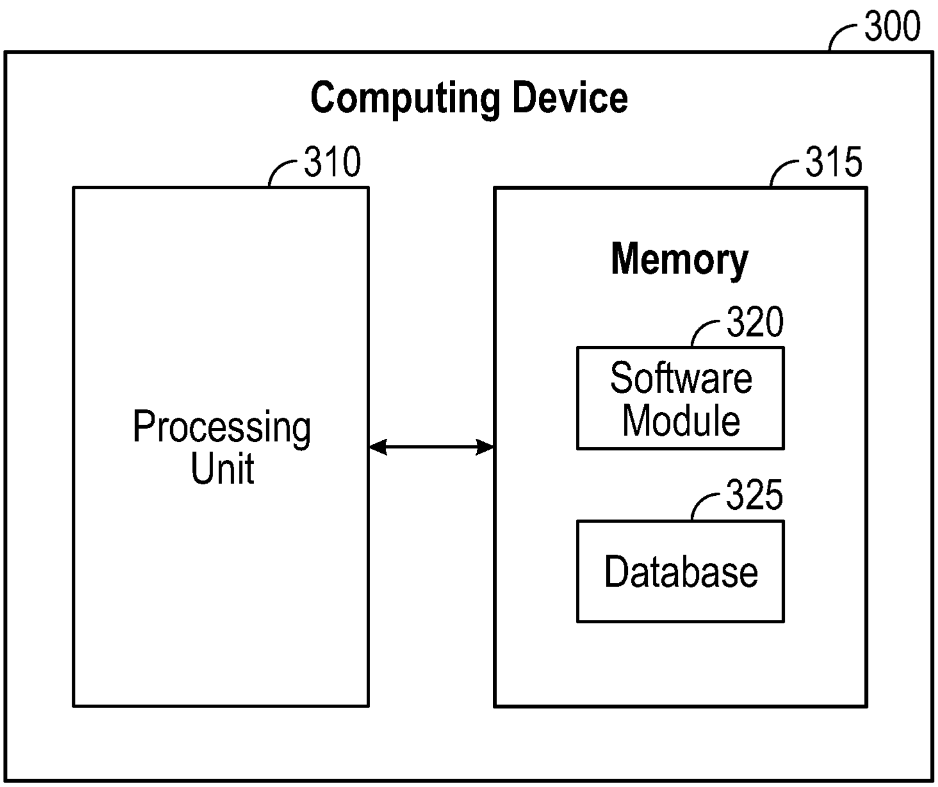
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for Tx power variation mitigation for RSSI based location determination, including for example, any one or more of the stages from method 200 described above with respect to FIG. 2. Computing device 300, for example, may provide an operating environment for station 102, first AP 104, second AP 106, third AP 108, and controller 110. Station 102, first AP 104, second AP 106, third AP 108, and controller 110 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving Received Signal Strength Indicator (RSSI) data from a plurality of Access Points (APs) for a station, wherein receiving the RSSI data comprises receiving a RSSI value determined from a Block Acknowledgement (BA) packet and a Starting Sequence Number (SSN) and a bitmap of the BA packet;

clustering the plurality of APs into one or more clusters based on a combination of the SSN and the bitmap of the BA packet, wherein one or more APs having a same combination of the SSN and the bitmap are clustered into one cluster;

determining a probable location of the station in each of the one or more clusters based on RSSI values received from each of the one or more APs of each of the one or more clusters, wherein determining the probable location of the station in each of the one or more clusters based on the RSSI values comprises determining the probable location of the station in each of the one or more clusters based on a differential RSSI solution; and determining a final location of the station based on merging probable locations from the one or more clusters.

2. The method of claim 1, wherein receiving the RSSI data further comprises receiving a Media Access Control (MAC) address of the station.

3. The method of claim 1, further comprising:

sending a prioritized packet list to the plurality of APs, the prioritized packet list comprising a listing of a plurality of BA packets to be observed and a priority level for each of the plurality of BA packets.

4. The method of claim 1, further comprising:

receiving the RSSI data corresponding to the BA packet observed with a highest priority level.

5. The method of claim 1, wherein determining the final location of the station based merging the probable locations from the one or more clusters comprises averaging the probable location from each of the one or more clusters to determine the final location.

6. The method of claim 1, wherein determining the final location of the station based merging the probable locations from the one or more clusters comprises performing machine learning regression on the probable location from each of the one or more clusters to determine the final location.

7. A system comprising:

a memory storage; and a processing unit coupled to the memory storage, wherein the processing unit is operative to:

receive Received Signal Strength Indicator (RSSI) data from a plurality of Access Points (APs) for a station, wherein the RSSI data comprises a RSSI value determined from a Block Acknowledgement (BA) packet and a Starting Sequence Number (SSN) and a bitmap of the BA packet;

cluster the plurality of APs into one or more clusters based on a combination of the SSN and the bitmap of the BA packet, wherein one or more APs having a same combination of the SSN and the bitmap are clustered into one cluster;

determine a probable location of the station in each of the one or more clusters based on RSSI values received from each of the one or more APs of each of the one or more clusters, wherein the processing unit being operative to determine the probable location of the station in each of the one or more clusters based on the RSSI values comprises the processing unit being operative to determine the probable location of the station in each of the one or more clusters based on a differential RSSI solution; and determine a final location of the station based on merging probable locations from the one or more clusters.

8. The system of claim 7, wherein the RSSI data further comprises a Media Access Control (MAC) address of the station.

9. The system of claim 7, wherein the processing unit is further operative to:

send a prioritized packet list to the plurality of APs, the prioritized packet list comprising a listing of a plurality of BA packets to be observed and a priority level for each of the plurality of BA packets.

10. The system of claim 7, wherein the processing unit is further operative to:

receive the RSSI data corresponding to the BA packet observed with a highest priority level.

11. The system of claim 7, wherein the processing unit being operative to determine the final location of the station based merging the probable locations from the one or more clusters comprises the processing unit being operative to average the probable location from each of the one or more clusters to determine the final location.

12. The system of claim 7, wherein the processing unit being operative to determine the final location of the station based merging the probable locations from the one or more clusters comprises the processing unit being operative to perform machine learning regression on the probable location from each of the one or more clusters to determine the final location.

13. A non-transitory computer-readable medium that stores a set of instructions which when executed perform a method comprising:

receiving Received Signal Strength Indicator (RSSI) data from a plurality of Access Points (APs) for a station, wherein receiving the RSSI data comprises receiving a RSSI value determined from a Block Acknowledgement (BA) packet and a Starting Sequence Number (SSN) and a bitmap of the BA packet;

clustering the plurality of APs into one or more clusters based on a combination of the SSN and the bitmap of the BA packet, wherein one or more APs having a same combination of the SSN and the bitmap are clustered into one cluster;

determining a probable location of the station in each of the one or more clusters based on RSSI values received from each of the one or more APs of each of the one or more clusters, wherein determining the probable location of the station in each of the one or more clusters based on the RSSI values comprises determining the probable location of the station in each of the one or more clusters based on a differential RSSI solution; and determining a final location of the station based on merging probable locations from the one or more clusters.

14. The non-transitory computer-readable medium of claim 13, wherein receiving the RSSI data further comprises receiving a Media Access Control (MAC) address of the station.

15. The non-transitory computer-readable medium of claim 13, further comprising:

sending a prioritized packet list to the plurality of APs, the prioritized packet list comprising a listing of a plurality of BA packets to be observed and a priority level for each of the plurality of BA packets.

16. The non-transitory computer-readable medium of claim 13, further comprising:

receiving the RSSI data corresponding to the BA packet observed with a highest priority level.

17. The non-transitory computer-readable medium of claim 13, wherein determining the final location of the station based merging the probable locations from the one or more clusters comprises averaging the probable location from each of the one or more clusters to determine the final location.

* * * * *